US012025856B1

(12) United States Patent
DiChiara et al.

(10) Patent No.: US 12,025,856 B1
(45) Date of Patent: Jul. 2, 2024

(54) VENTED EYEGLASS FRAME

(71) Applicant: Liberty Sport, Inc., Fairfield, NJ (US)

(72) Inventors: Carmine S. DiChiara, Warren, NJ (US); Deni Crescenzi, Toronto (CA)

(73) Assignee: Liberty Sport, Inc., Fairfield, NJ (US)

( * ) Notice: Subject to any disclaimer, the term of this patent is extended or adjusted under 35 U.S.C. 154(b) by 242 days.

(21) Appl. No.: 17/190,993

(22) Filed: Mar. 3, 2021

Related U.S. Application Data

(60) Provisional application No. 62/984,980, filed on Mar. 4, 2020.

(51) Int. Cl.
*G02C 5/00* (2006.01)
*G02C 1/00* (2006.01)
*G02C 11/08* (2006.01)

(52) U.S. Cl.
CPC ............... *G02C 5/001* (2013.01); *G02C 1/10* (2013.01); *G02C 11/08* (2013.01); *G02C 5/008* (2013.01)

(58) Field of Classification Search
CPC .......... G02C 5/001; G02C 1/10; G02C 11/08; G02C 5/008; G02C 1/00
USPC .......................................................... 351/62
See application file for complete search history.

(56) References Cited

U.S. PATENT DOCUMENTS

| 4,730,915 | A |   | 3/1988 | Jannard |                    |
|-----------|---|---|--------|---------|--------------------|
| 5,227,817 | A | * | 7/1993 | Simioni | A61F 9/025         |
|           |   |   |        |         | 351/86             |
| 5,576,775 | A | * | 11/1996| Bolle   | G02C 11/08         |
|           |   |   |        |         | 2/436              |
| 5,648,831 | A | * | 7/1997 | Martin  | A61F 9/028         |
|           |   |   |        |         | 351/111            |
| 5,898,468 | A |   | 4/1999 | Mage    |                    |
| 6,460,996 | B2| * | 10/2002| Okui    | G02C 1/06          |
|           |   |   |        |         | 351/86             |
| D473,892  | S | * | 4/2003 | Thixton | D16/314            |

(Continued)

FOREIGN PATENT DOCUMENTS

| FR | 2 697 921 A1 | 11/1992 | |
| WO | WO-9641230 A1 * | 12/1996 | ............. A61F 9/028 |
| WO | WO-9839682 A1 * | 9/1998 | ............. A61F 9/028 |

OTHER PUBLICATIONS

Endurasport, "Guppy Glasses Black", [URL: https://www.endurasport.com/Guppy-Glasses/p/bE0091] retrieved Oct. 14, 2019.

(Continued)

*Primary Examiner* — Zachary W Wilkes
(74) *Attorney, Agent, or Firm* — Myers Wolin, LLC

(57) ABSTRACT

A vented eyeglass frame is provided having a front frame extending laterally from a first end to a second end and for connecting to a temple at each of the first end and the second end. The front frame has first and second lens openings, with each lens opening being defined by a respective opening boundary at least partially circumscribing the corresponding lens opening. A bridge is defined between the first and second lens openings, and outer vents are provided at each end adjacent the corresponding lens openings. Inner vents are then provided at the bridge adjacent the lens openings. The lens opening boundaries each have a lens channel for at least partially enveloping a lens located at the respective lens opening, and each vent is defined by a gap in the corresponding lens opening.

10 Claims, 6 Drawing Sheets

(56) References Cited

U.S. PATENT DOCUMENTS

| | | | | |
|---|---|---|---|---|
| 6,550,914 B1* | 4/2003 | Kopfer | ............... | G02C 11/08 |
| | | | | 351/62 |
| 6,793,336 B2 | 9/2004 | Min | | |
| 7,278,733 B2 | 10/2007 | Olney | | |
| 7,314,277 B2 | 1/2008 | Lin | | |
| 7,484,843 B1 | 2/2009 | Lin | | |
| D590,868 S * | 4/2009 | Wilkerson | ............ | G02C 1/06 |
| | | | | D16/301 |
| 7,543,933 B2 | 6/2009 | Lee | | |
| 7,651,218 B2 | 1/2010 | Schmied | | |
| 8,226,229 B2 | 7/2012 | Jacquemin | | |
| D828,867 S * | 9/2018 | Chen | ...................... | D16/326 |
| 2011/0001921 A1* | 1/2011 | Matera | ............... | G02C 11/08 |
| | | | | 351/62 |
| 2016/0231599 A1* | 8/2016 | Tipp | .................. | G02C 11/08 |
| 2016/0306197 A1* | 10/2016 | Chen | .................. | G02C 11/08 |

OTHER PUBLICATIONS

Liberty Sport, "H-Wall Wrap", [URL: https://www.libertysport.com/h-wall-wrap.html] retrieved Oct. 14, 2019.

Nike, "Nike Brazen Radiation Glasses", [URL: https://www.universalmedicalinc.com/nike-brazen-radiation-glasses.html] retrieved Oct. 14, 2019.

Randy Jackson, "Randy Jackson 1055", [URL: https://www.eyeglassworld.com/shop/all-glasses/glasses-for-men/randy-jackson-1055/p/164250] retrieved Oct. 14, 2019.

Sunglass Spot, "Action Sport Large 58MM Flat Top Squared Frame Ventilated Bridge Sunglasses", retrieved Oct. 14, 2019.

* cited by examiner

VENTED EYEGLASS FRAME

CROSS REFERENCE TO RELATED APPLICATIONS

This application claims the benefit of U.S. Provisional Application No. 62/984,980, filed Mar. 4, 2020, the contents of which are incorporated by reference herein.

FIELD OF THE INVENTION

This disclosure relates generally to eyeglass frames, and more particularly to eyeglass frames which incorporate ventilation to improve airflow behind the lenses thereof.

BACKGROUND

Eyeglasses, particularly protective eyeglasses, are commonly used in connection with various activities, including sports. Such protective eyeglasses may be, for example sunglasses having tinted lenses, or protective prescription eyeglasses provided for improving visibility for a user. Such protective eyeglasses may be worn, for example, for sporting activities in which eye protection is recommended, such as skiing, cycling, motorcycle racing, and the like, and such protective eyeglasses would be used to keep snow, dust, or insects, for example, out of a user's eyes.

When protective eyeglasses are used for athletic activities or other activities, users may encounter fogging or misting generated by condensation build up on an interior surface of eyeglass lenses. Such interior condensation cannot be wiped away by a user, as it is on an interior surface of the lens, and it dramatically decreases a user's visibility, thereby increasing the risk associated with the athletic activity.

A variety of solutions for mitigating such condensation have been proposed. Among such solutions are proposals for increasing airflow behind the lenses of such frames. Such increased airflow allows for the replacement of warm moist air behind the lenses with cooler and drier air. To facilitate such a replacement, prior art eyeglasses may incorporate ventilation ports. However, the orientation, location, and scale of such ventilation ports dramatically affect the effectiveness of such a solution.

Existing ventilation ports may provide too much airflow during high speed athletic activities, such that a user may experience excess wind across his eyes. Alternatively, existing ventilation ports may provide too little airflow, such that the warm moist air behind the lenses is not sufficiently replaced to avoid fogging, rendering the solution ineffective.

Further, excessive ventilation may render the frames less protective by weakening their structure or by creating vents that dust or bugs can pass through, for example. Further, some such vents are located obtrusively, such that frames containing such vents are less attractive, or such that the location of lens openings or a bridge of such frames must be modified.

There is a need for a venting solution in eyeglass frames, particularly protective eyeglass frames, that unobtrusively and attractively directs airflow behind lenses retained by the frames.

SUMMARY

In some embodiments, a vented eyeglass frame is provided comprising a front frame extending laterally from a first end to a second end and for connecting to a temple at each of the first end and the second end.

The front frame typically comprises a first lens opening and a second lens opening, with each lens opening being defined by a respective first lens opening boundary and a second lens opening boundary at least partially circumscribing the respective lens opening.

A bridge is then defined between the first and second lens openings, and a first outer vent is provided at the first end adjacent the first lens opening and a second outer vent is provided at the second end adjacent the second lens opening. A first inner vent is then provided at the bridge adjacent the first lens opening and a second inner vent is provided at the bridge adjacent the second lens opening.

The first lens opening boundary and the second lens opening boundary each have a lens channel for at least partially enveloping a lens located at the respective lens opening, and each vent is defined by a gap in the corresponding lens opening.

In some such embodiments, the first outer vent is at the interface between the first lens opening and the first end of the front frame, and the second outer vent is at the interface between the second lens opening and the second end of the front frame. The first and second inner vents are provided at the interfaces between the first and second lens openings respectively and the bridge.

In some such embodiments, each vent comprises a plurality of supports extending across the gap in the corresponding lens opening boundary to abut the corresponding lens opening, such that when a lens is located in the corresponding lens opening, the supports extend to abut the lens opening, or a lens contained therein.

In some embodiments, the lens channels of the first and second lens opening boundaries have a consistent profile, and wherein a profile of the lens channels of the supports is the same as the consistent profile.

In some such embodiments, at least some of the supports extend from corresponding linear elements on a front surface of the front frame. Further, in some such embodiments, the vented eyeglass frame further comprises a first and second secondary vent on side surfaces of the first and second ends of the front frame respectively, wherein at least some of the linear elements on the front surface extend across the first and second secondary vents.

In some embodiments, the first and second secondary vents are provided without the corresponding linear elements. In such embodiments, the first and second secondary vents may be provided at an interface between the first and second ends of the frame and the corresponding temple. Further, the vented eyeglass frame may further comprise a removable insert for covering at least a portion of the first and second secondary vents. Such a removable insert may be shaped to direct air passing through an exposed segment of the first and second secondary vents.

In some embodiments, where the vents comprise a plurality of supports, each such vent comprises the same number of supports, and a linear extension of each support of each outer vent would meet a corresponding linear extension of the corresponding inner vent.

DETAILED DESCRIPTION OF THE PREFERRED EMBODIMENTS

Figure 1:
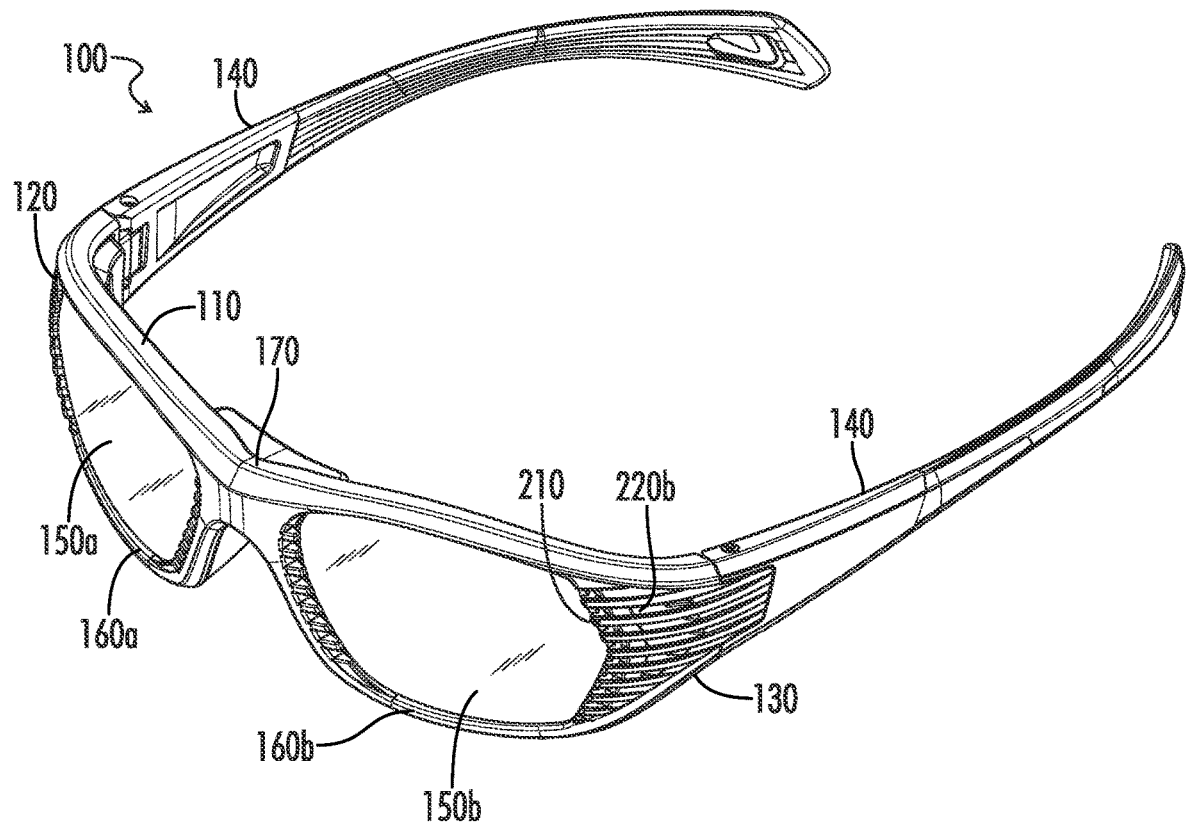
FIG. 1 is perspective view of a first embodiment of an eyeglass frame in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
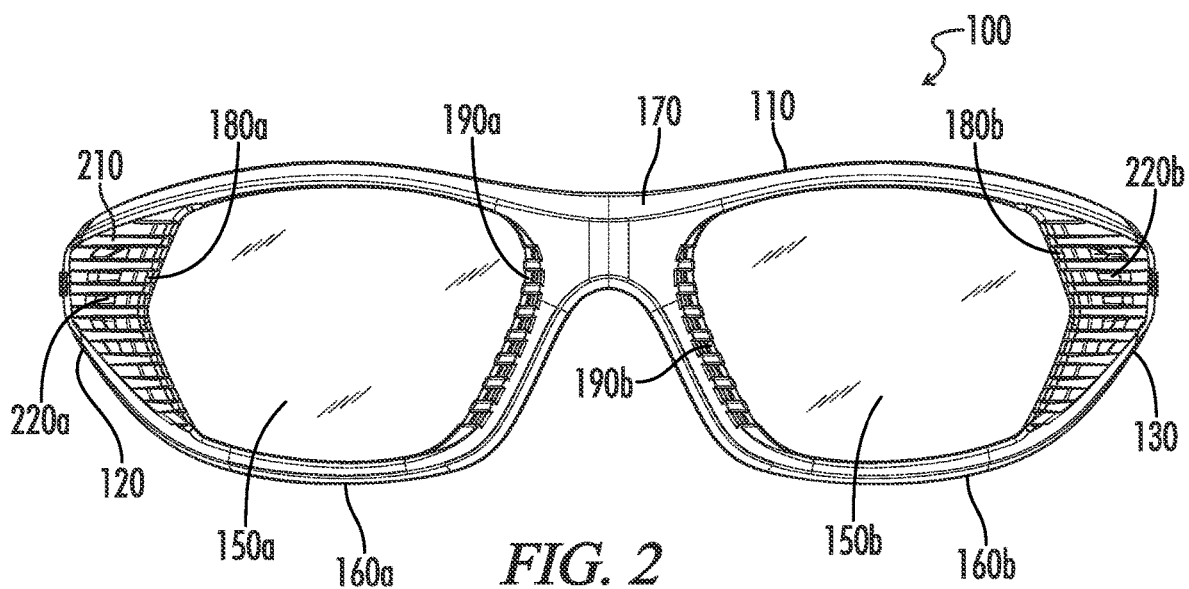
FIG. 2 is a front view of the eyeglass frame of FIG. 1.
Figure 3:
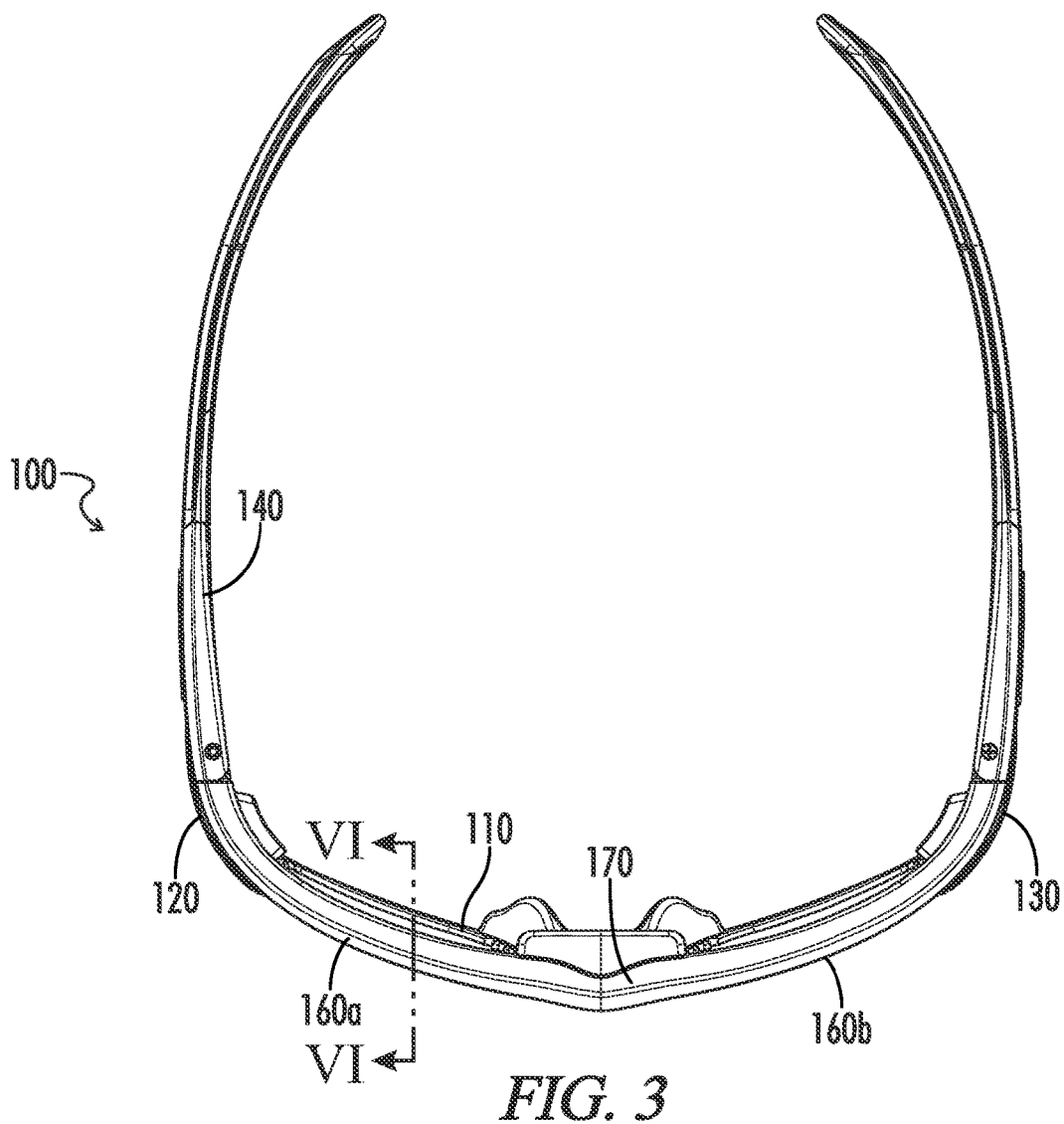
FIG. 3 is a top view of the eyeglass frame of FIG. 1.
Figure 4:
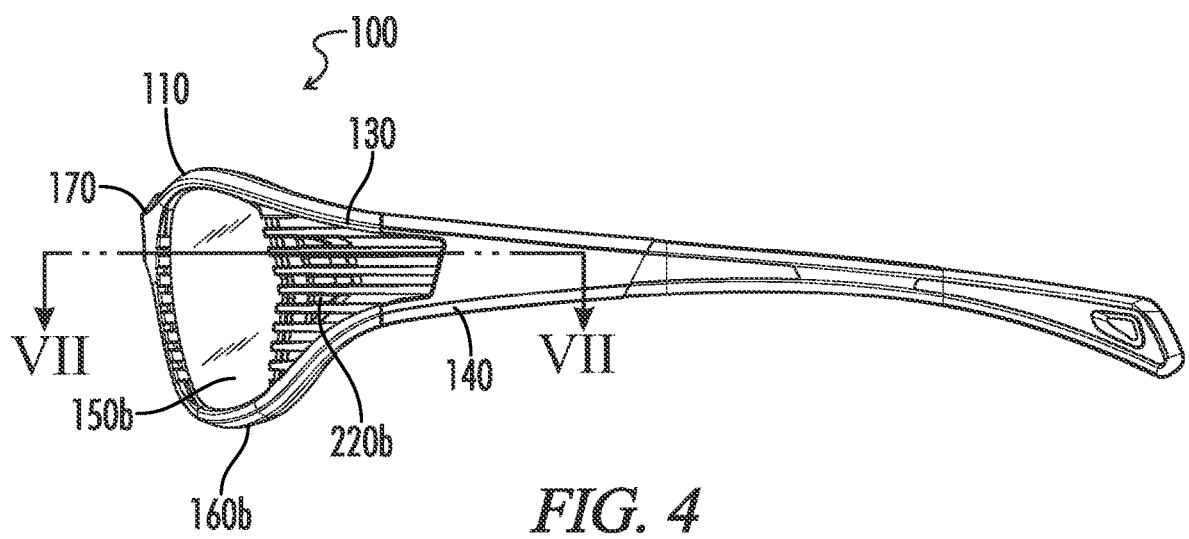
FIG. 4 is a side view of the eyeglass frame of FIG. 1.
Figure 5:
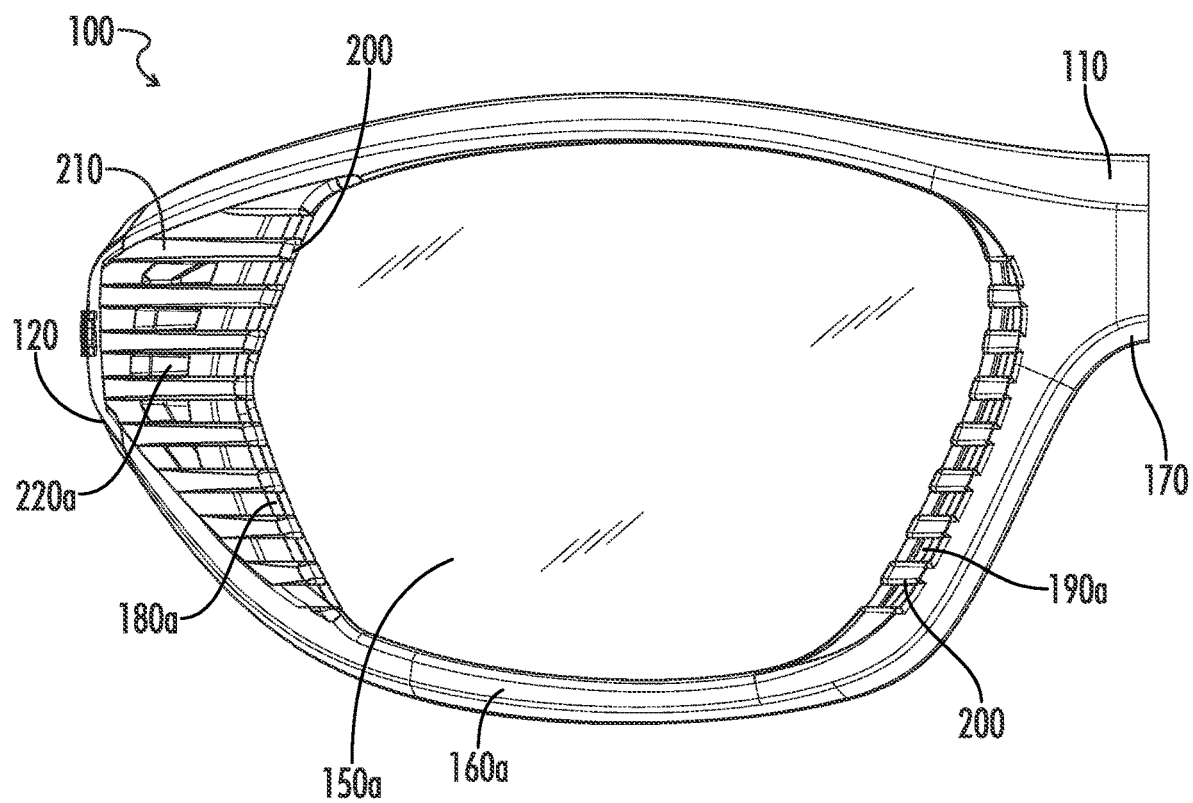
FIG. 5 is an enlarged view of a portion of a front frame in the eyeglass frame of FIG. 1.

FIG. 1 is perspective view of a first embodiment of an eyeglass frame 100 in accordance with this disclosure. FIG. 2 is a front view, FIG. 3 is a top view, and FIG. 4 is a side view of the eyeglass frame 100 of FIG. 1. FIG. 5 is an enlarged view of a portion of the eyeglass frame 100 of FIG. 1.

As shown, the eyeglass frame 100 is a vented frame comprising a front frame 110 extending laterally from a first end 120 to a second end 130. At each end 120, 130, the front frame 110 connects to a corresponding temple 140.

The front frame 110 has two lens openings 150a, b, and each lens opening is defined by a respective lens opening boundary 160a, b. The lens opening boundary 160a, b at least partially circumscribes the respective lens opening 150a, b. As such, lenses located within each lens opening 150a, b may be retained within lens channels contained in the corresponding lens opening boundary 160a, b.

The front frame 110 further comprises a bridge 170 defined between the first lens opening 150a and the second lens opening 150b. As such, the first lens opening 150a extends from the first end 120 to the bridge 170 and the second lens opening 150b extends from the second end 130 to the bridge 170.

The front frame 110 further comprises outer vents 180a, b and inner vents 190a, b. The outer vents 180a, b are located between the ends of the frame 120, 130 and the respective lens openings 150a, b. Accordingly, a first outer vent 180a is located at the first end of the frame 120 and adjacent the first lens opening 150a. As the first outer vent 180a is directly adjacent the first lens opening 150a, it takes the form of a gap in the first lens opening boundary 160a.

Similarly, a second outer vent 180b is located at the second end of the frame 130 and adjacent the second lens opening 150b, such that it forms a gap in the second lens opening boundary 160b.

The inner vents 190a, b are located in the bridge 170. Accordingly, a first inner vent 190a is located in the bridge 170 and adjacent the first lens opening 150a such that it forms an additional gap in the first lens opening boundary 160a. Similarly, a second inner vent 190b is located in the bridge 170 and adjacent the second lens opening 150b such that it forms an additional gap in the second lens opening boundary 160b.

Because of the gaps provided in the first and second lens opening boundaries 160a, b, the lens opening boundaries do not entirely circumscribe the corresponding lens openings 150a, b. Instead, the lens opening boundaries 160a, b span the bottom and top and part of the sides of the corresponding lens openings 150a, b. The first outer vent 180a is then at the interface between the first lens opening 150a and the first end of the frame 120, the second outer vent 180b is at the interface between the second lens opening 150b and the second end of the frame 130, and the inner vents 190a, b are at the interfaces between the bridge 170 and the first and second lens openings 150a, b respectively.

Each vent 180a, b, 190a, b may comprise a plurality of supports 200, with the supports extending across the gap in the corresponding lens opening boundary 160a, b to abut the corresponding lens opening 150a, b. Accordingly, when a lens is located in the corresponding lens opening 150a, b, the supports 200 extend to abut and, in some cases, stabilize the lens.

Further, as shown, each vent 180a, b, 190a, b may comprise the same number of supports 200, and a linear extension of each support may extend across the corresponding lens opening 150a, b to meet a corresponding support 200 from a different vent, thereby presenting a coherent overall aesthetic.

Figure 6:
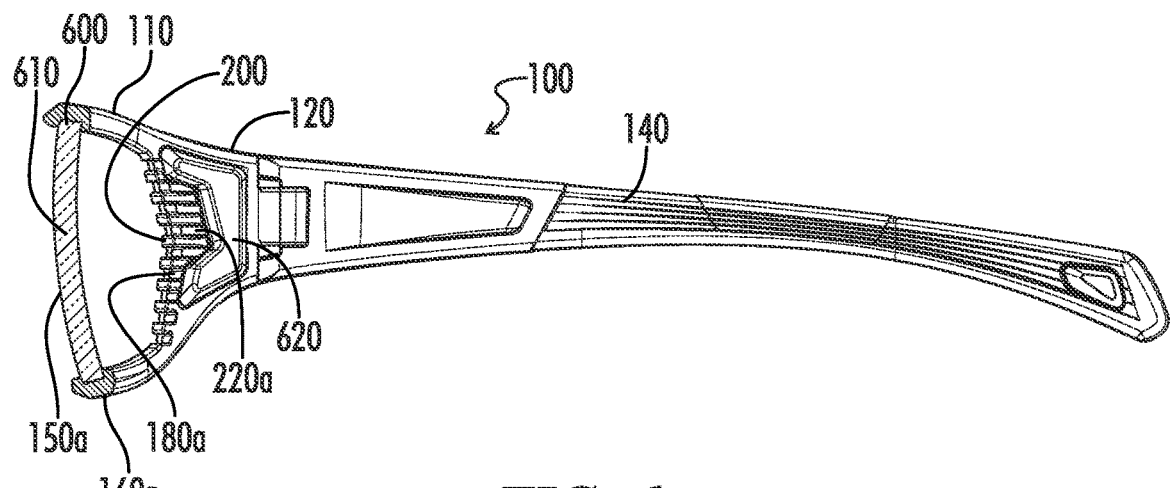
FIG. 6 is a section view of the eyeglass frame of FIG. 1 taken along line VI-VI of FIG. 3.
Figure 7:
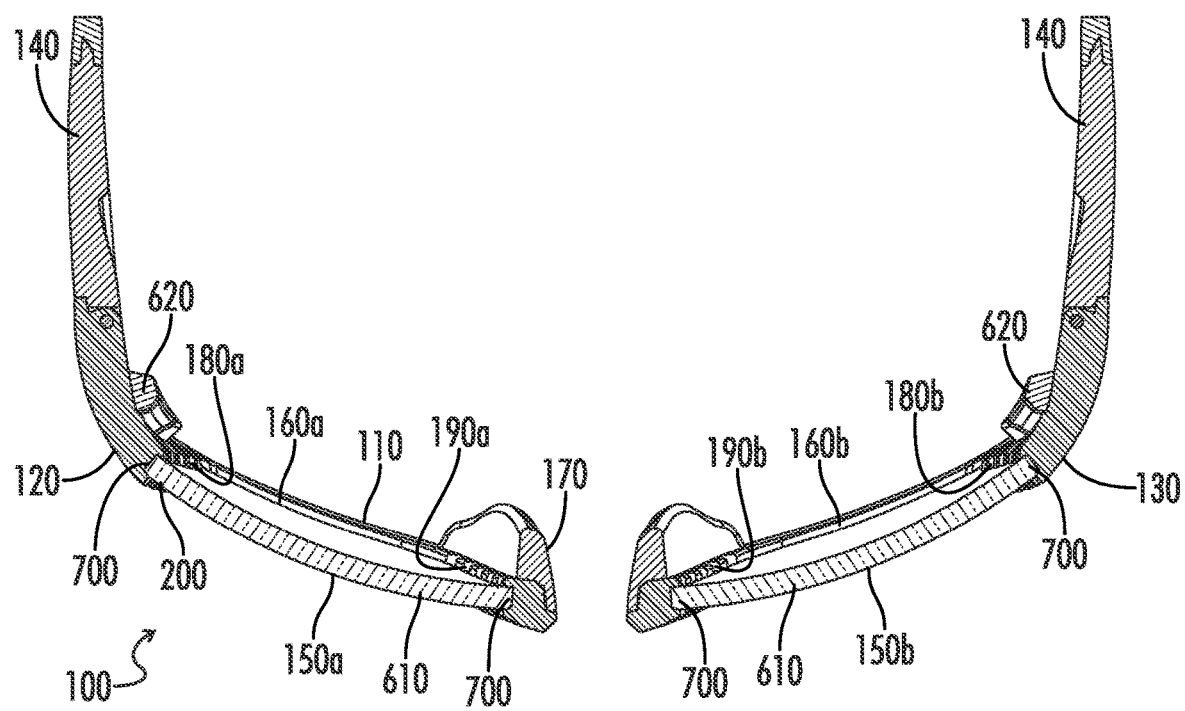
FIG. 7 is a section view of the eyeglass frame of FIG. 1 taken along line VII-VII of FIG. 4.
Figure 11:
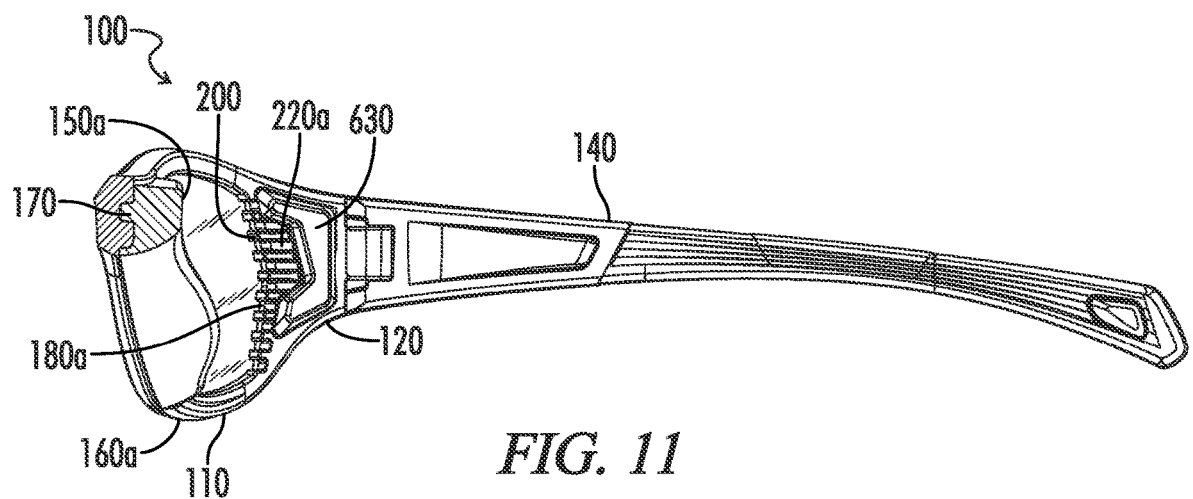
FIG. 11 is the section view of FIG. 6 with an insert removed.

FIG. 6 is a section view of the eyeglass frame of FIG. 1 taken along line VI-VI of FIG. 3. FIG. 7 is a section view of the eyeglass frame of FIG. 1 taken along line VII-VII of FIG. 4. FIG. 11 is the section view of the eyeglass frame 100 of FIG. 6 with an insert 620 removed.

As noted above, and as shown in FIG. 6, each lens opening boundary 160a is provided with a lens channel 600. The lens channel at least partially envelopes a lens 610 when located in the corresponding lens opening 150a. As shown, the lens channel 600 may have a consistent profile, and it may be configured to correspond to or interact with a profile of the outer edge of a lens 610.

Further, as shown, each support 200 may be provided with a lens channel 700 at the surface abutting the corresponding lens opening 150a, b. The profile of the lens channels 700 in the supports 200 may correspond with the consistent profile of the lens channel 600 in the lens opening boundaries 160a, b.

In some embodiments, first and second ends 120, 130 may be provided with linear elements 210 on their respective surfaces. In such embodiments, the supports 200 may extend from the corresponding linear elements.

Further, in some embodiments, the eyeglass frame 100 may be provided with secondary vents 220a, b located at the first and second ends of the frame 120, 130 respectively. In such an embodiment, the linear elements 210 of the first and second ends of the frame 120, 130 may extend across the corresponding secondary vents 220a, b.

As such, the supports 200 may provide substantial support for a lens 610 contained within each lens opening 150a, b despite the gaps in the lens opening boundaries 160a, b. Such a structure enhances the strength of the eyeglass frame 100 themselves, improving their performance as protective eyeglass frames. Further, the supports 200 allow airflow to pass between them, but block larger particulate matter. Similarly, the linear elements 210 extending across the secondary vents 220a, b allows for the blockage of larger particulate matter from passing through those vents while presenting a coherent and aesthetically pleasing visual.

In some embodiments, the secondary vents 220a, b may be provided at an interface between the first and second ends of the frame 120, 130, and a corresponding temple 140.

Further, in some embodiments having first and second secondary vents 220a, b, a vent insert 620 is provided to cover the side vents. As shown, the vent insert 620 may cover at least a portion of the first and second secondary vents 220a, b. The vent insert 620 may be removable, such that the amount of air passing through the secondary vents 220a, b may be increased or decreased. Alternatively, in some embodiments, the insert may be permanent, and may be adhered permanently to the frame 100. Further, the vent insert 620 may be shaped so as to direct air passing through the secondary vents 220a, b as appropriate. For example, the vent insert 620 may form a C shape with an inner part of the C shaped for directing airflow.

Accordingly, distinct vent inserts 620 may be provided to adapt the glasses frame 100 for different activities. For example, the vent insert 620 shown may be designed for use in motorsports, such that some air passing through the secondary vents 220a, b are directed across a user's face when the user turns his face. Alternatively, vent inserts may be provided to fully close the secondary vents 220a, b, or the vent inserts may be removed entirely to allow for unrestricted air flow. As shown in FIG. 11, when the insert 620 is removed, a recess 630 may remain for locating the insert. The recess 630 may be provided with a fixation mechanism, such as a magnet, for retaining the insert 620 when the insert is installed.

Further, the insert 620 described may be formed as a cap or a plug, such that it can be applied to the frame 100 in different ways. Further, the insert 620 may be formed from a soft material, a hard material, or a combined material. In the embodiment shown, the insert 620 may be applied from the underside, or inside, of the frame 100. In other embodiments, the insert 620 may be replaced with a cap applied from an exterior of the frame 100.

Figure 8:
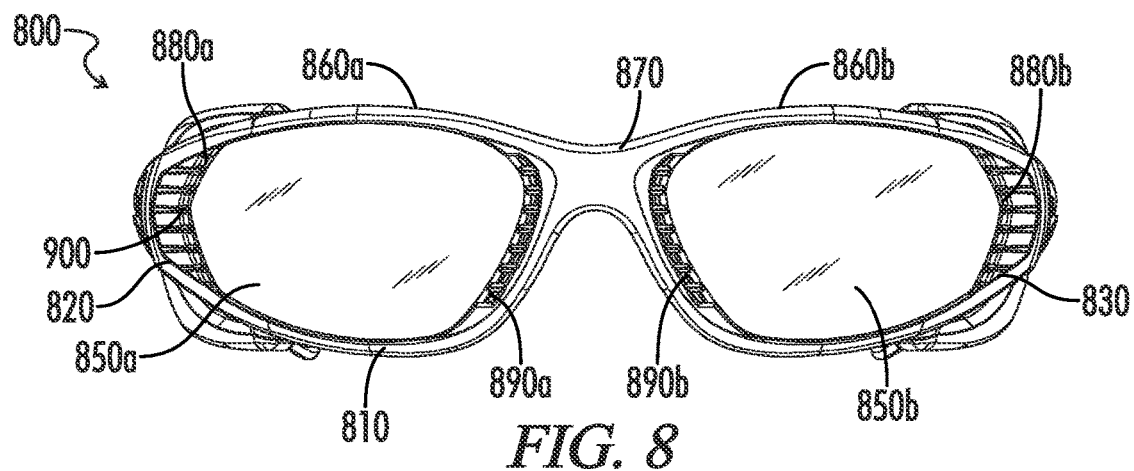
FIG. 8 is a front view of a second embodiment of eyeglass frame in accordance with this disclosure.
Figure 9:
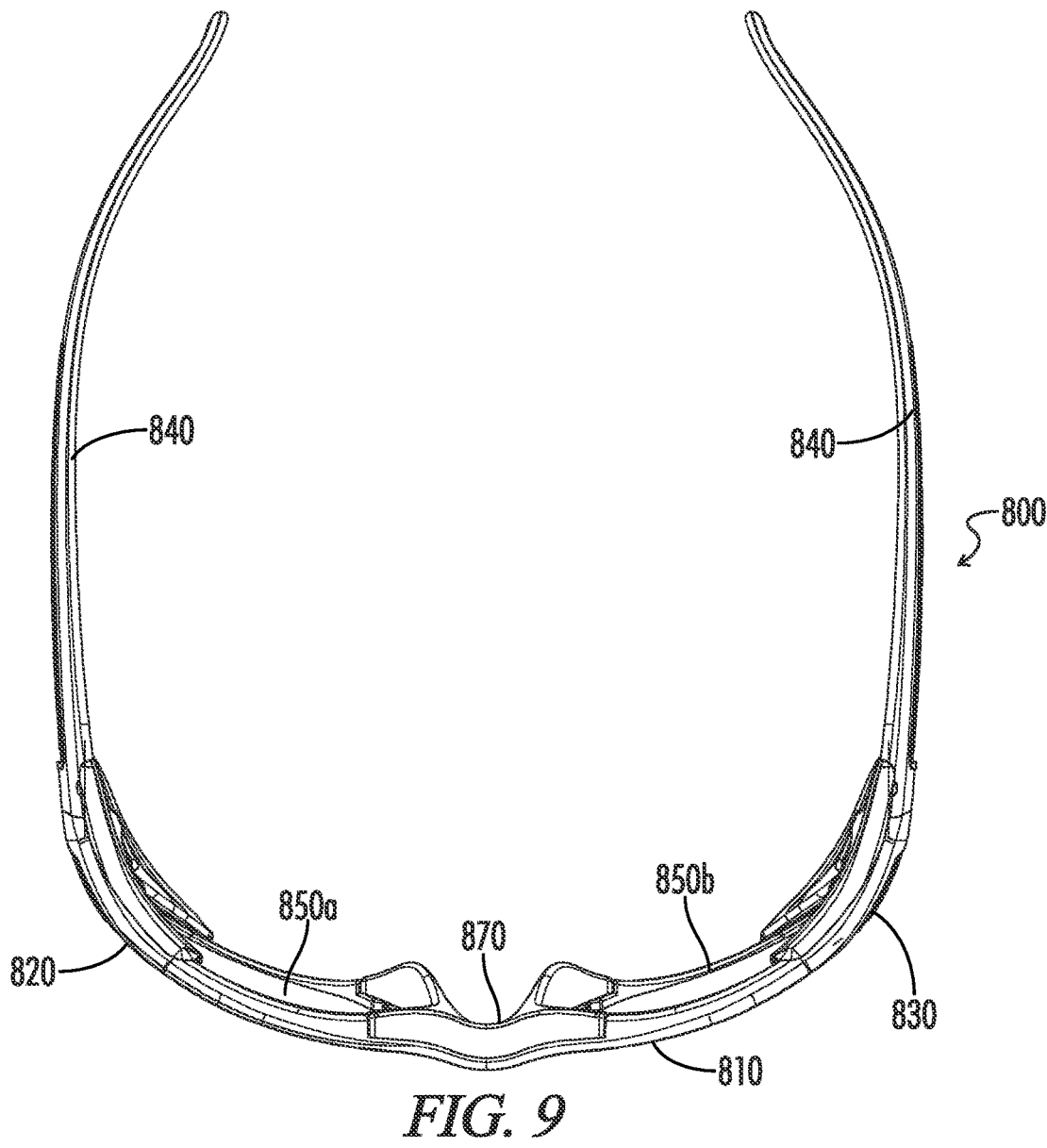
FIG. 9 is a top view of the eyeglass frame of FIG. 8.
Figure 10:
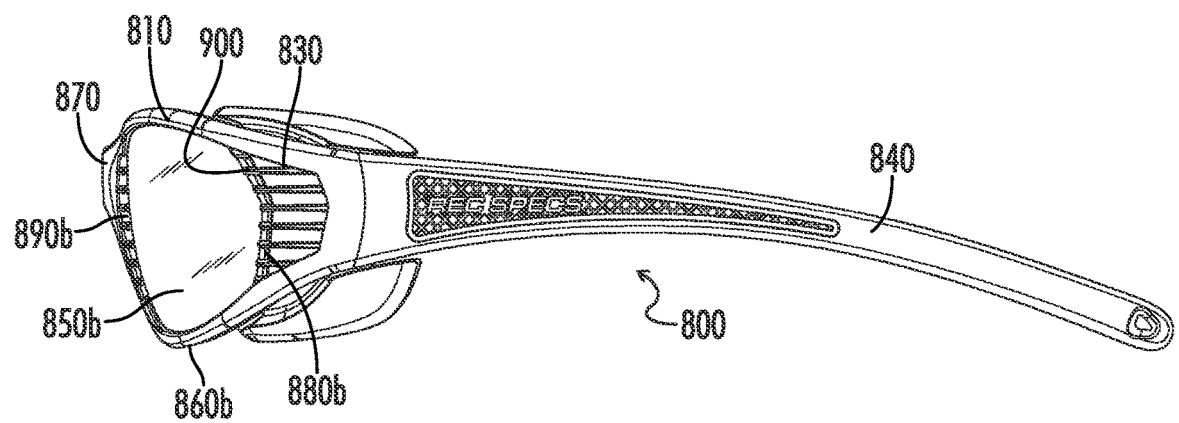
FIG. 10 is a side view of the eyeglass frame of FIG. 8.

FIG. 8 is a front view of a second embodiment of an eyeglass frame 800 in accordance with this disclosure. FIG. 9 is a top view of the eyeglass frame 800 of FIG. 8, and FIG. 10 is a side view of the eyeglass frame of FIG. 8.

The eyeglass frame 800 is similar in many respects to the eyeglass frame 100 discussed above with respect to FIG. 1. Accordingly, the eyeglass frame 800 is a vented frame comprising a front frame 810 extending laterally from a first end 820 to a second end 830. At each end, 820, 830, the front frame 810 connects to a corresponding temple 840.

The front frame has two lens openings 850a, b, with each lens opening being defined by a respective lens opening boundary 860a, b at least partially circumscribing the lens corresponding lens opening. The lens opening boundary 860a, b typically contains a lens channel for retaining a lens in the lens opening 850a, b.

The front frame 810 further comprises a bridge 870 defined between the first lens opening 850a and the second lens opening 850b. As such, the first lens opening 850a extends from the first end 820 to the bridge 870 and the second lens opening 850b extends from the second end 830 to the bridge 870.

The front frame 810 further comprises outer vents 880a, b and inner vents 890a, b. The outer vents 880a, b are located between the ends of the frame 810, 820 and the respective lens openings 850a, b. Accordingly, a first outer vent 880a is located at the first end of the frame 810 and adjacent the first lens opening 850a. As the first outer vent 880a is directly adjacent the first lens opening 850a, it takes the form of a gap in the first lens opening boundary 860a.

Similarly, a second outer vent 880b is located at the second end of the frame 820 and adjacent the second lens opening 850b, such that it forms a gap in the second lens opening boundary 860b.

The inner vents 890a, b are located in the bridge 870. Accordingly, a first inner vent 890a is located in the bridge 870 and adjacent the first lens opening 850a such that it forms an additional gap in the first lens opening boundary 860a. Similarly, a second inner vent 890b is located in the bridge 870 and adjacent the second lens opening 850b such that it forms an additional gap in the second lens opening boundary 860b.

Because of the gaps provided in the first and second lens opening boundaries 860a, b, the lens opening boundaries do not entirely circumscribe the corresponding lens openings 850a, b. Instead, the lens opening boundaries 860a, b span the bottom and top and part of the sides of the corresponding lens openings 850a, b. The first outer vent 880a is then at the interface between the first lens opening 850a and the first end of the frame 820, the second outer vent 880b is at the interface between the second lens opening 850b and the second end of the frame 830, and the inner vents 890a, b are at the interfaces between the bridge 870 and the first and second lens openings 850a, b respectively.

Each vent 880a, b, 890a, b may comprise a plurality of supports 900, with the supports extending across the gap in the corresponding lens opening boundary 860a, b to abut the corresponding lens opening 850a, b. Accordingly, when a lens is located in the corresponding lens opening 850a, b, the supports 900 extend to abut the lens.

Although not shown, the lens opening boundaries 860a, b and supports 900 may take a form similar to those discussed above with respect to the embodiment of FIG. 1, and may contain lens channels similar to those shown in FIGS. 6 and 7.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A vented eyeglass frame comprising:
  a front frame extending laterally from a first end to a second end and for connecting to a temple at each of the first end and the second end;
  the front frame comprising:
    a first lens opening and a second lens opening, each of the lens openings being defined by a respective first lens opening boundary and a second lens opening boundary fully circumscribing the respective lens opening;
    a bridge defined between the first and second lens openings;
    a first outer vent at the first end adjacent the first lens opening;
    a second outer vent at the second end adjacent the second lens opening;
    a first inner vent at the bridge adjacent the first lens opening and opposite the first lens opening from the first outer vent;
    a second inner vent at the bridge adjacent the second lens opening and opposite the second lens opening from the second outer vent;
  wherein the first lens opening boundary and the second lens opening boundary each have a lens channel comprising abutting surfaces for at least partially enveloping and abutting an outer edge of a lens located at the respective lens opening;
  wherein each vent is defined by a gap in the corresponding lens opening boundary and corresponding lens channel, the gap comprising a discontinuity in all abutting surfaces of the corresponding lens channel at a vent location;
  wherein the first outer vent is at an interface between the first lens opening and the first end of the front frame, the second outer vent is at an interface between the second lens opening and the second end of the front frame, and the first and second inner vents are at corresponding interfaces between the first and second lens openings respectively and the bridge,
  wherein each vent comprises a plurality of supports extending across the corresponding gap in the corresponding lens opening boundary to abut the corresponding lens opening, such that when a lens is located in the corresponding lens opening, the supports extend to abut the lens, and
  wherein a hypothetical linear extension of each support of each inner vent would meet a corresponding linear extension of the corresponding outer vent.

2. The vented eyeglass frame of claim 1, wherein each support has a lens channel at a surface abutting the corresponding lens opening.

3. The vented eyeglass frame of claim 2, wherein the lens channels of the first and second lens opening boundaries have a consistent profile, and wherein a profile of the lens channels of the supports is the same as the consistent profile.

4. The vented eyeglass frame of claim 1, wherein at least some of the supports extend from corresponding linear elements on a front surface of the front frame.

5. The vented eyeglass frame of claim 4 further comprising a first and second secondary vent on side surfaces of the first and second ends of the front frame respectively, wherein at least some of the linear elements on the front surface extend across the first and second secondary vents.

6. The vented eyeglass frame of claim 1, wherein each vent comprises the same number of supports.

7. The vented eyeglass frame of claim 1 further comprising a first and second secondary vent on side surfaces of the first and second ends of the front frame respectively.

8. The vented eyeglass frame of claim 7, wherein the first and second secondary vents are at an interface between the first and second ends of the frame and a corresponding temple.

9. The vented eyeglass frame of claim 7 further comprising a removable insert for covering at least a portion of the first and second secondary vents.

10. The vented eyeglass frame of claim 9, wherein the removable insert is shaped to direct air passing through an exposed segment of the first and second secondary vents.

* * * * *